US010717462B2

(12) United States Patent
Oka et al.

(10) Patent No.: US 10,717,462 B2
(45) Date of Patent: Jul. 21, 2020

(54) SENSOR DEVICE AND ELECTRIC POWER STEERING DEVICE USING SAME

(71) Applicant: DENSO CORPORATION, Kariya, Aichi-pref. (JP)

(72) Inventors: Atsuko Oka, Kariya (JP); Shuji Kuramitsu, Kariya (JP); Koichi Nakamura, Kariya (JP)

(73) Assignee: DENSO CORPORATION, Kariya, Aichi-Pref. (JP)

( * ) Notice: Subject to any disclaimer, the term of this patent is extended or adjusted under 35 U.S.C. 154(b) by 0 days.

(21) Appl. No.: 16/083,665

(22) PCT Filed: Feb. 1, 2017

(86) PCT No.: PCT/JP2017/003501
§ 371 (c)(1),
(2) Date: Sep. 10, 2018

(87) PCT Pub. No.: WO2017/159090
PCT Pub. Date: Sep. 21, 2017

(65) Prior Publication Data
US 2019/0039643 A1 Feb. 7, 2019

(30) Foreign Application Priority Data
Mar. 17, 2016 (JP) .................. 2016-53616

(51) Int. Cl.
B62D 5/04 (2006.01)
G01D 3/08 (2006.01)
(Continued)

(52) U.S. Cl.
CPC .......... B62D 5/0484 (2013.01); B62D 5/049 (2013.01); B62D 5/0463 (2013.01); B62D 6/10 (2013.01);
(Continued)

(58) Field of Classification Search
CPC combination set(s) only.
See application file for complete search history.

(56) References Cited

U.S. PATENT DOCUMENTS 9,233,763 B1 * 1/2016 Chen ................. G05B 23/0235
2014/0102219 A1 * 4/2014 Kuwahara ............. B62D 5/049
73/862.333

(Continued)

FOREIGN PATENT DOCUMENTS

JP 2012-45990 A 8/2012
JP 2015-081013 A 4/2015
(Continued)

OTHER PUBLICATIONS

Machine translation JP 2015-081013; published Apr. 2015.*

Primary Examiner — Abby Y Lin
Assistant Examiner — Renee LaRose
(74) Attorney, Agent, or Firm — Maschoff Brennan

(57) ABSTRACT

A sensor device includes: multiple sensor units, each of which includes multiple sensor elements and a signal processing unit that generates and transmits an output signal including multiple detection signals corresponding to detection values of the sensor elements; and multiple control units, each of which includes a communication unit that receives the output signal, an abnormality monitoring unit that monitors abnormality of the respective sensor unit, and a physical quantity computation unit that computes a physical quantity based on at least one of the detection signals which is normal. One control unit mutually transmits and receives the detection signals as subject sensor signals received from the respective sensor unit and the detection signals as other sensor signals received from another one of the control units with another system control unit.

10 Claims, 10 Drawing Sheets

(51) Int. Cl.
  *G01D 3/10* (2006.01)
  *G01D 5/244* (2006.01)
  *B62D 6/10* (2006.01)
  *G01L 25/00* (2006.01)
  *G01L 3/10* (2006.01)
  *G01L 5/22* (2006.01)

(52) U.S. Cl.
  CPC .............. *G01D 3/08* (2013.01); *G01D 3/10* (2013.01); *G01D 5/24461* (2013.01); *G01L 25/003* (2013.01); *G01L 3/101* (2013.01); *G01L 5/221* (2013.01)

(56) References Cited

U.S. PATENT DOCUMENTS

2014/0158455 A1* 6/2014 Takaki .................. G01D 5/244
                                                                180/446
2015/0369679 A1* 12/2015 Ishimoto ................ G01L 3/104
                                                                73/862.331

FOREIGN PATENT DOCUMENTS

JP      2016-003984 A    1/2016
WO      2017/159089 A1   9/2017

* cited by examiner

SENSOR DEVICE AND ELECTRIC POWER STEERING DEVICE USING SAME

CROSS REFERENCE TO RELATED APPLICATION

This application is based on Japanese Patent Application No. 2016-53616 filed on Mar. 17, 2016, the disclosure of which is incorporated herein by reference.

TECHNICAL FIELD

The present disclosure relates to a sensor device and an electric power steering device using the sensor device.

BACKGROUND ART

Up to now, an electric power steering device having two systems of torque sensors has been known. For example, in Patent Literature 1, when an abnormality of one of the torque sensors is detected, a steering assist control is continued with the use of a steering torque detected by the torque sensor where no abnormality is detected.

In Patent Literature 1, a torque sensor in which an abnormality occurs is identified based on a deviation between a detection value and an estimated torque of the torque sensor. In addition, excessive assist is prevented by setting an upper limit value of a target assist torque based on the deviation between the detection value and the estimated torque of the torque sensor.

However, in Patent Literature 1, when an abnormality of one of the torque sensors is detected, an abnormality detection cannot be performed by comparing the detection values of both the torque sensors with each other, and the abnormality detection accuracy may be lowered.

PRIOR ART LITERATURES

Patent Literature

Patent Literature 1: JP-2012-45990-A

SUMMARY

It is an object of the present disclosure to provide a sensor device continuing abnormality detection and physical quantity computation even when an abnormality occurs in one or some sensor elements, and an electric power steering device using the sensor device.

According to a first aspect of the present disclosure, a sensor device includes: a plurality of sensor units, each of which includes a plurality of sensor elements and a signal processing unit that generates and transmits an output signal including a plurality of detection signals corresponding to detection values of the sensor elements; and a plurality of control units, each of which includes a communication unit that receives the output signal transmitted from a respective sensor unit, an abnormality monitoring unit that monitors abnormality of the respective sensor unit, and a physical quantity computation unit that computes a physical quantity based on at least one of the detection signals which is normal. One of the control units mutually transmits the detection signals as a plurality of subject sensor signals, included in the output signal received from the respective sensor unit, to another one of the control units, and receives the detection signals as a plurality of other sensor signals, included in the output signal received from another one of the sensor units by another one of the control units as another system control unit, from the another system control unit.

In the sensor device described above, even when one or some sensor elements are abnormal, if two or more sensor elements are normal, abnormality monitoring by signal comparison and torque computation can be continued.

According to a second aspect of the present disclosure, an electric power steering device includes: the sensor device according to the first aspect; a motor that outputs an assist torque for assisting a steering operation of a steering member by a driver; and a power transmission unit that transmits a torque of the motor to a driven object. The physical quantity computation unit computes a steering torque as the physical quantity. The control unit includes a command computation unit that computes a command value related to a drive control of the motor based on the steering torque.

In the electric power steering device described above, even if the abnormality occurs in one or some sensor elements, if two or more sensor elements are normal, the abnormality monitoring by signal comparison and the torque computation can be continued.

BRIEF DESCRIPTION OF DRAWINGS

The above and other objects, features and advantages of the present disclosure will become more apparent from the following detailed description made with reference to the accompanying drawings. In the drawings.

EMBODIMENTS

Hereinafter, a sensor device and an electric power steering device using the sensor device according to the present disclosure will be described with reference to the drawings. In multiple embodiments to be described hereinafter, the same reference sings will be assigned to substantially the same configuration elements, the description thereof will be omitted.

First Embodiment

A first embodiment of the present disclosure is illustrated in FIGS. 1 to 6.

Figure 1:
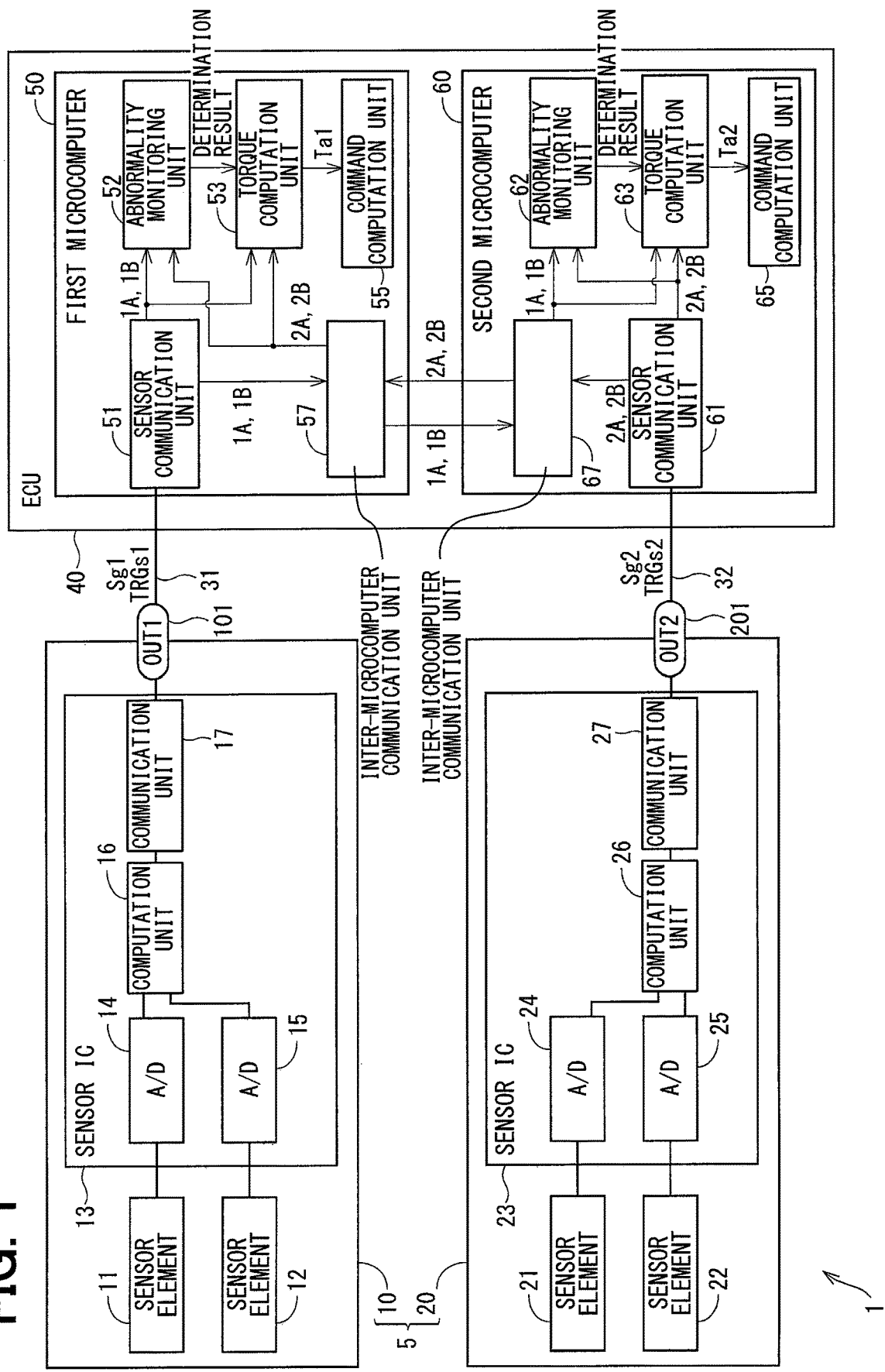
FIG. 1 is a block diagram showing a configuration of a sensor device according to a first embodiment of the present disclosure.

As shown in FIG. 1, a sensor device 1 includes multiple sensor units 10, 20 and multiple microcomputers 50, 60 as control units. The sensor units 10 and 20 are included in a sensor unit 5, and the microcomputers 50 and 60 are included in an ECU 40.

Figure 2:
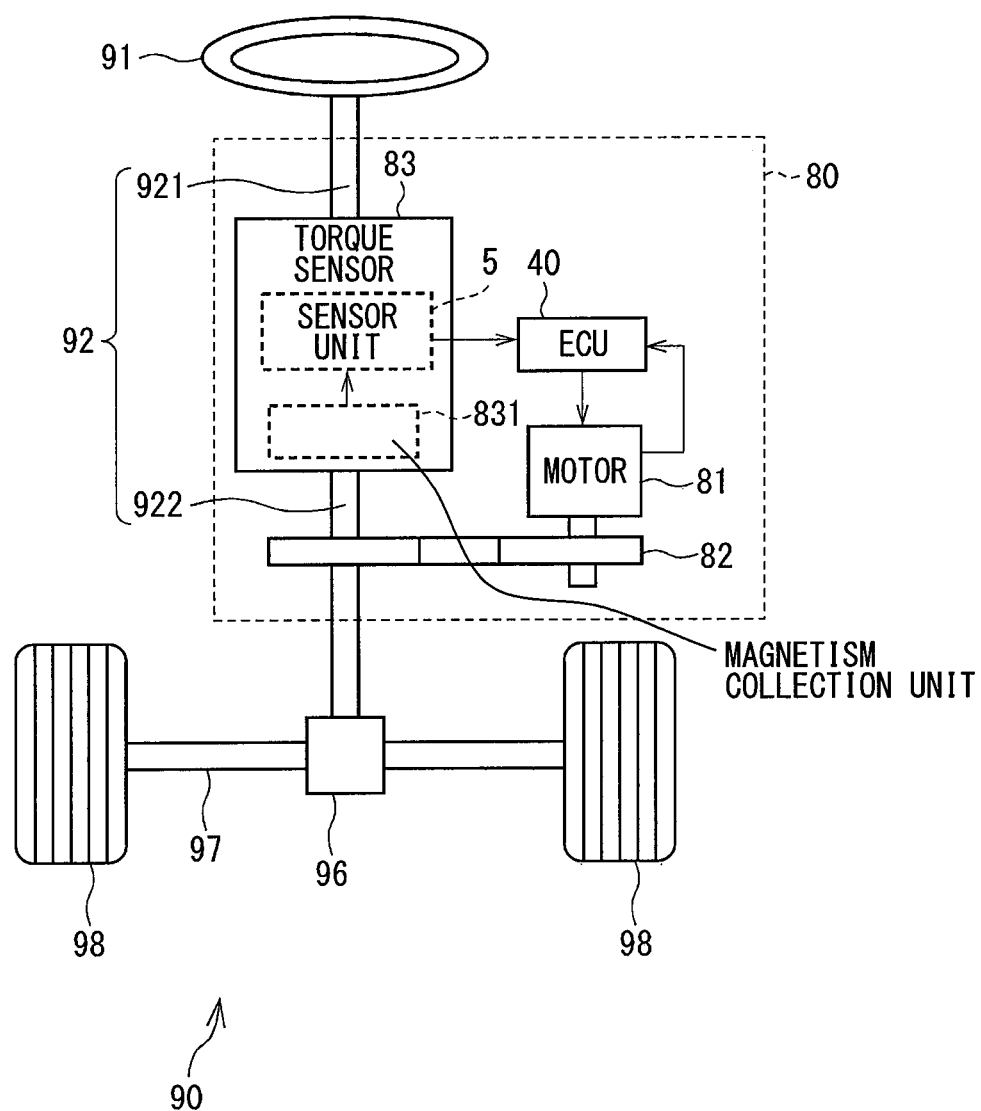
FIG. 2 is a schematic configuration diagram of a steering system according to the first embodiment of the present disclosure.

As shown in FIG. 2, the sensor unit 5 and the ECU 40 are applied to, for example, an electric power steering device 80 for assisting a steering operation of a vehicle. FIG. 2 illustrates an overall configuration of a steering system 90 equipped with the electric power steering device 80.

As shown in FIG. 2, a steering wheel 91 as a steering member is connected to a steering shaft 92. The steering shaft 92 has an input shaft 921 as a first shaft and an output shaft 922 as a second shaft. The input shaft 921 is connected to the steering wheel 91. A torque sensor 83 is provided between the input shaft 921 and the output shaft 922, and the torque sensor 83 detects a torque to be applied to the steering shaft 92. A pinion gear 96 is provided at a leading end of the output shaft 922 on a side opposite to the input shaft 921. The pinion gear 96 meshes with a rack shaft 97. Both ends of the rack shaft 97 are coupled with a pair of wheels 98 through a tie rod or the like.

When a driver rotates the steering wheel 91, the steering shaft 92 connected to the steering wheel 91 rotates. The rotational motion of the steering shaft 92 is converted into a linear motion of the rack shaft 97 by the pinion gear 96, and the pair of wheels 98 is steered to an angle corresponding to the displacement amount of the rack shaft 97.

The electric power steering device 80 includes a motor 81 that outputs an assist torque Ta for assisting a driver to steer the steering wheel 91, a reduction gear 82 as a power transmission portion, the torque sensor 83, the ECU 40, and the like. In FIG. 2, although the motor 81 and the ECU 40 are separate from each other, but may be integrated with each other.

The reduction gear 82 reduces the rotation of the motor 81 and transmits the reduced rotation to the steering shaft 92. In other words, the electric power steering device 8 according to the present embodiment is a so-called "column assist type" in which an object to be driven is the steering shaft 92, but may be a so-called "rack assist type" in which the object to be driven is the rack shaft 97 and the rotation of the motor 85 is transmitted to the rack shaft 97.

The torque sensor 83 is provided on the steering shaft 92, and detects the steering torque based on a torsion angle between the input shaft 921 and the output shaft 922. The torque sensor 83 includes a torsion bar not shown, a magnetism collection unit 831 as an object to be detected, the sensor unit 5, and the like. The torsion bar coaxially couples the input shaft 921 and the output shaft 922 on a rotation axis and converts the torque applied to the steering shaft 92 into a torsional displacement. The magnetism collection unit 831 has a multipolar magnet, a magnetic yoke, a magnetism collection ring, and the like, and is configured so as to change the magnetic flux density according to a torsional displacement amount and a torsional displacement direction of the torsion bar. Since a general configuration of the torque sensor 83 is well known, the detailed configuration is omitted from illustration.

As shown in FIG. 1, the sensor unit 5 includes a first sensor unit 10 and a second sensor unit 20.

The first sensor unit 10 is provided with a communication terminal 101 and is connected to a first microcomputer 50 through a communication line 31. As a result, the first sensor unit 10 and the first microcomputer 50 can transmit and receive signals and the like with respect to each other. The second sensor unit 20 is provided with a communication terminal 201 and is connected to a second microcomputer 60 through a communication line 32. As a result, the second sensor unit 20 and the second microcomputer 60 can transmit and receive signals and the like with respect to each other.

Further, the sensor units 10 and 20 are connected to the ECU 40 through power supply lines and ground lines not shown. As a result, a power is supplied from the ECU 40 side to the sensor units 10 and 20.

The first sensor unit 10 has two sensor elements 11, 12 and a sensor IC 13 as a signal processing unit, and is provided corresponding to the first microcomputer 50. The sensor elements 11 and 12 are Hall elements which are magnetic detection elements for detecting a change in a magnetic flux of the magnetism collection unit 831 according to the torque applied to the steering shaft 92.

The sensor IC 13 includes A/D conversion units 14, 15, a computation unit 16, and a communication unit 17.

The A/D conversion unit 14 converts the detection value of the sensor element 11 into a digital signal, and the A/D conversion unit 15 converts the detection value of the sensor element 12 into a digital signal. Hereinafter, a signal corresponding to the detection value of the sensor element 11 is referred to as a signal 1A, and a signal corresponding to the detection value of the sensor element 12 is referred to as a signal 1B.

The computation unit 16 generates an output signal Sg1 including the signals 1A and 1B.

The communication unit 17 receives a signal transmission trigger TRGs1 transmitted from the first microcomputer 50. Upon receiving the signal transmission trigger TRGs1, the communication unit 17 transmits the output signal Sg1 to the first microcomputer 50 accordingly.

The second sensor unit 20 has two sensor elements 21, 22 and a sensor IC 23 as a signal processing unit, and is provided corresponding to the second microcomputer 60. As with the sensor elements 11 and 12, the sensor elements 21 and 22 are Hall elements which are magnetic detection elements for detecting a change in a magnetic flux of the magnetism collection unit 831 according to the torque applied to the steering shaft 92.

The sensor IC 23 has A/D conversion units 24 and 25, a computation unit 26, and a communication unit 27.

The A/D conversion unit 24 converts the detection value of the sensor element 21 into a digital signal, and the A/D conversion unit 25 converts the detection value of the sensor element 22 into a digital signal. Hereinafter, a signal corresponding to the detection value of the sensor element 21 is referred to as a signal 2A, and a signal corresponding to the detection value of the sensor element 22 is referred to as a signal 2B.

The computation unit 26 generates an output signal Sg2 including the signals 2A and 2B.

The communication unit 27 receives a signal transmission trigger TRGs1 transmitted from the second microcomputer 60. Upon receiving the signal transmission trigger TRGs1, the communication unit 27 transmits the output signal Sg2 to the second microcomputer 60 accordingly.

The signals 1A and 2A are positive signals whose detection value increases as the torque increases and the signals 1B and 2B are inverted signals whose detection value decreases as the torque increases. In other words, in the present embodiment, the positive signal is the signal A, and the inverted signal is the signal B. A sum of the signal 1A or the signal 2A which is the positive signal and the signal 1B or the signal 2B which is the inverted signal is a predetermined value T if normal.

The ECU 40 mainly includes the microcomputers 50, 60, and so on, and performs various arithmetic processes. Each process in the ECU 40 may be a software processing in which a CPU executes a program stored in advance, or may be a hardware processing performed by a dedicated electronic circuit. The first microcomputer 50 performs various processes based on the output signal Sg1 acquired from the first sensor unit 10. The second microcomputer 60 performs various processes based on the output signal Sg2 acquired from the second sensor unit 20.

The first microcomputer 50 includes a sensor communication unit 51, an abnormality monitoring unit 52, a torque computation unit 53 as a physical quantity computation unit, a command computation unit 55, an inter-microcomputer communication unit 57, and the like.

The sensor communication unit 51 transmits the signal transmission trigger TRGs1 to the first sensor unit 10 and receives the output signal Sg1 transmitted from the first sensor unit 10 according to the signal transmission trigger TRGs1.

The abnormality monitoring unit 52 monitors the abnormality of the sensor elements 11 and 12 with the use of at least two of the signals 1A and 1B included in the output signal Sg1 and the signals 2A and 2B acquired from the second microcomputer 60. Incidentally, the abnormality of the sensor element 11 is not limited to the abnormality of the sensor element 11 per se but includes wiring abnormality, signal conversion abnormality, and the like, and is appropriately described simply as the abnormality of the sensor element 11. The same is applied to the abnormality of the sensor elements 12, 21, and 22.

The torque computation unit 53 computes a steering torque Ts1 with the use of at least one of the signals 1A, 1B, 2A, and 2B. Further, the torque computation unit 53 computes an assist torque Ta1 based on the steering torque Ts1.

The command computation unit 55 computes a command value related to driving of the motor 81 based on the assist torque Ta1.

The second microcomputer 60 includes a sensor communication unit 61, an abnormality monitoring unit 62, a torque computation unit 63 as a physical quantity computation unit, a command computation unit 65, an inter-microcomputer communication unit 67, and the like.

The sensor communication unit 61 transmits a signal transmission trigger TRGs2 to the second sensor unit 20 and receives the output signal Sg2 transmitted from the second sensor unit 20 according to the signal transmission trigger TRGs2.

The abnormality monitoring unit 62 monitors the abnormality of the sensor elements 21 and 22 with the use of at least two of the signals 2A and 2B included in the output signal Sg2 and the signals 1A and 1B acquired from the first microcomputer 50.

The torque computation unit 63 computes a steering torque Ts2 with the use of at least one of the signals 1A, 1B, 2A, and 2B. Further, the torque computation unit 63 computes an assist torque Ta2 based on the steering torque Ts2.

The command computation unit 65 computes a command value related to the driving of the motor 81 based on the assist torque Ta2.

In the present embodiment, the steering torques Ts1 and Ts2 have the same value if normal, but a difference of about the detection error is allowed. Further, the assist torques Ta1 and Ta2 are set to ½ of an assist torque Ta to be output as the motor 81. In other words, Ta=Ta1+Ta2.

In this example, a combination of the first sensor unit 10 and the first microcomputer 50 provided corresponding to each other, and a combination of the second sensor unit 20 and the second microcomputer 60 provided corresponding to each other are referred to as "systems". Hereinafter, as appropriate, the combination of the first sensor unit 10 and the first microcomputer 50 will be referred to as "first system", and the combination of the second sensor unit 20 and the second microcomputer 60 will be referred to as "second system". In the present embodiment, the first sensor unit 10 and the first microcomputer 50 can communicate directly with each other, and the first sensor unit 10 and the second microcomputer 60 cannot communicate directly with each other. Further, the second sensor unit 20 and the second microcomputer 60 can communicate directly with each other, and the second sensor unit 20 and the first microcomputer 50 cannot communicate directly with each other.

The microcomputers 50 and 60 according to the present embodiment have the inter-microcomputer communication units 57 and 67, respectively, and can communicate between the microcomputers 50 and 60. The inter-microcomputer communication unit 57 in the first microcomputer 50 can transmit the signals 1A and 1B to the inter-microcomputer communication unit 67 of the second microcomputer 60, and can receive the signals 2A and 2B from the inter-microcomputer communication unit 67. In addition, the inter-microcomputer communication unit 67 can transmit the signals 2A and 2B to the inter-microcomputer communication unit 57, and can receive the signals 1A and 1B from the inter-microcomputer communication unit 57. In other words, the microcomputers 50 and 60 can mutually transmit and receive the signals 1A and 1B and the signals 2A and 2B.

A digital communication such as an SENT (single edge nibble transmission) communication is performed between the sensor units 10, 20 and the microcomputers 50, 60 and between the microcomputers 50 and 60. The communication method may be other than the SENT communication. Further, the communication method may be different between the communication between the sensor units and the microcomputers and the communication between the microcomputers.

Since the processing in the first system and the processing in the second system are substantially the same as each other, the following description will mainly be made as processing in the first system.

A torque computation process will be described with reference to a flowchart shown in FIG. 3. The process is executed by the microcomputer 50 at a predetermined interval during a period in which a start switch which is an ignition switch or the like is turned on. It is assumed that the abnormality determination state immediately after the start switch has been turned on is "normal".

Hereinafter, for example, "Step" of "Step S101" is omitted and is merely described with a symbol "S". The same is applied to Steps other than S101.

In a first S101, the microcomputer 50 determines whether an abnormality determination state to be described later is stopped, or not. When it is determined that the abnormality determination state is stop (yes in S101), the processing from S102 onward is not performed. When it is determined that the abnormality determination state is not stop (no in S101), the process proceeds to S102.

In S102, the sensor communication unit 51 transmits the signal transmission trigger TRGs1 to the first sensor unit 10.

In S103, the sensor communication unit 51 receives the output signal Sg1 from the first sensor unit 10.

In S104, the microcomputers 50 and 60 perform a communication between the microcomputers. In detail, the inter-microcomputer communication unit 57 transmits a signal including the signals 1A and 1B to the inter-microcomputer communication unit 67, and receives a signal including the signals 2A and 2B transmitted from the inter-microcomputer communication unit 67. In addition, the inter-microcomputer communication unit 67 receives the signal including the signals 1A and 1B from the inter-microcomputer communication unit 57, and transmits the signal including the signals 2A and 2B to the inter-microcomputer communication unit 57. The transmission and reception order of the signal including the signals 1A and 1B and the signal including the signals 2A and 2B is not limited. Further, the signal including the signals 1A and 1B may be the output signal Sg1 per se, or may be a signal different from the output signal Sg1 including the signals 1A and 1B. Similarly, the signal including the signals 2A and 2B may be the output signal Sg2 per se, or may be another signal.

In the present embodiment, if the abnormality determination state is other than "stop", a signal of another system is acquired by a regular communication in a predetermined cycle regardless of the abnormality determination state.

In S105, an abnormality determination process is performed. In this example, the abnormality determination process is performed subsequent to S104. Alternatively, the abnormality determination process may be performed at a predetermined frequency using, for example, a counter or the like.

Figure 4:
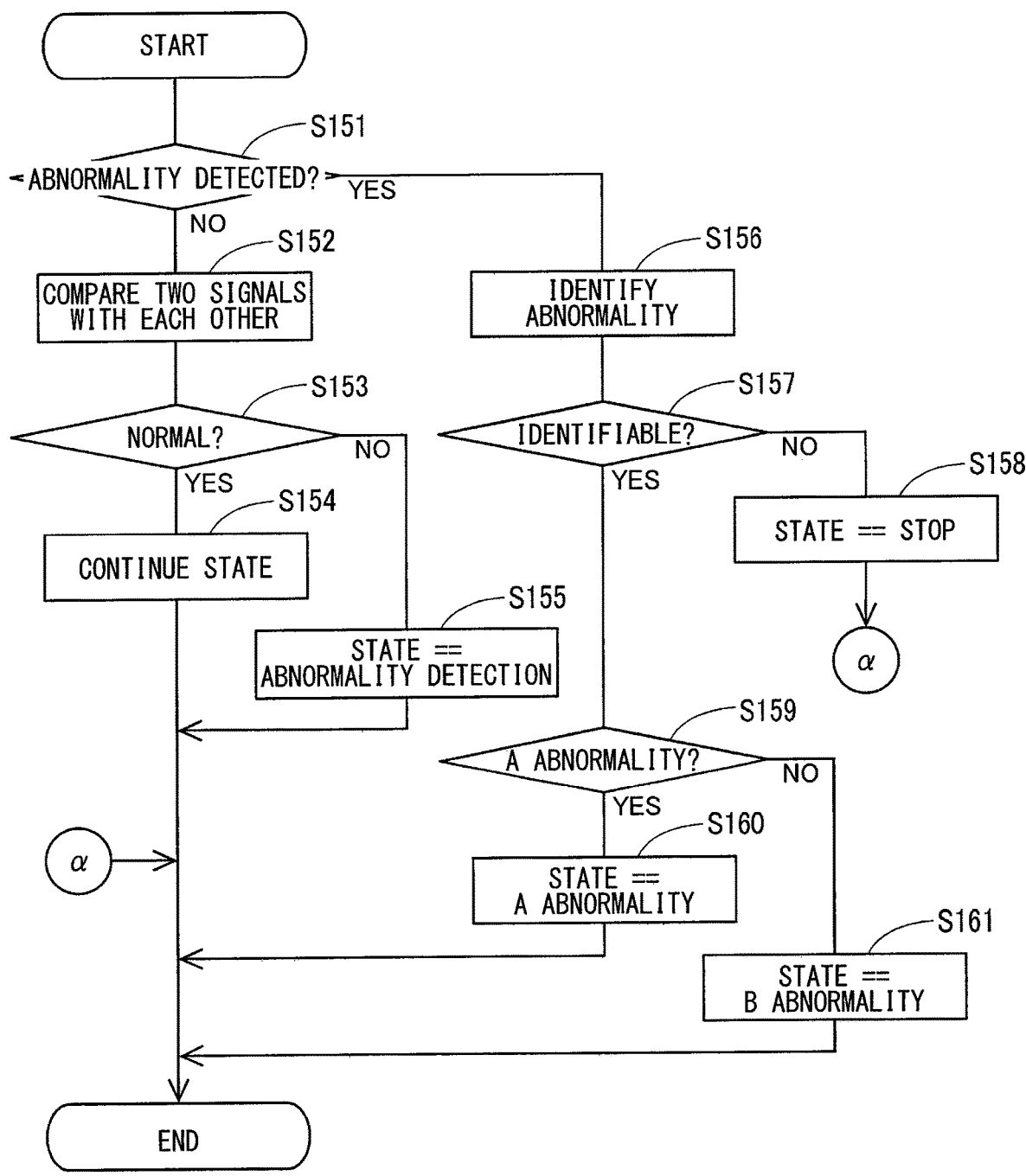
FIG. 4 is a flowchart illustrating an abnormality determination process according to the first embodiment of the present disclosure.

Further, the abnormality determination process shown in FIG. 4 may be performed separately from the torque computation process.

In S106 subsequent to the abnormality determination process, the torque computation unit 53 computes the steering torque Ts1 with the use of a signal that is normal. When the abnormality determination state is abnormality detection, the computation is performed with the use of the signal before the abnormality detection.

In S107, the torque computation unit 53 computes the assist torque Ta1 based on the steering torque Ts1.

The abnormality determination process will be described based on a flowchart shown in FIG. 4.

In S151, the abnormality monitoring unit 52 determines whether the abnormality determination state is abnormality detection, or not. When it is determined that the abnormality determination state is abnormality detection (yes in S151), the process proceeds to S156. When it is determined that the abnormality determination state is not abnormality detection (no in S151), the process proceeds to S152.

In S152, the abnormality monitoring unit 52 compares the two signals according to the abnormality determination state with each other. If the abnormality determination state is "normal", the abnormality monitoring unit 52 compares the signals 1A and 1B with each other. Further, if the abnormality determination state is "A abnormality", the abnormality monitoring unit 52 compares the signal 1B and the signal 2A with each other. If the abnormality determination state is "B abnormality", the abnormality monitoring unit 52 compares the signal 1A and the signal 2B with each other.

In this example, it is assumed that the signals used for comparison are "signals C and D". The signals C and D are any one of the signals 1A, 1B, 2A, and 2B corresponding to the abnormality determination state.

In the case where one of the signals C and D is a positive signal and the other is an inverted signal, it is assumed that a sum of the signals C and D at the time of normal is T and an abnormality determination threshold is Z1. Then, if the sum of the signals C and D is T−Z1 or more or T+Z1 or less, normality determination is performed. If the sum of the signals C and D is smaller than T−Z1 or larger than T+Z1, the abnormality determination is performed. In other words, the normality determination is carried out when (T−Z1)≤(C+D)≤(T+Z1), and the abnormality determination is carried out when (C+D)<T−Z1) or (T+Z1)<(C+D).

In the case where both of the signals C and D are the positive signals or the inverted signals, it is assumed that the abnormality determination threshold is Z2. Then, if an absolute value of a difference between the signals C and D is equal to or smaller than the abnormality determination threshold Z2, the normality determination is performed and if the absolute value of the difference between the signals C and D is larger than the abnormality determination threshold value Z2, the abnormality determination is performed. In other words, the normality determination is performed with |C−D|≤Z2, and the abnormality determination is performed with |C−D|>Z2.

Performing a comparison between the computed value such as the sum and difference of the two signals and the determination threshold is included in the concept of "comparing signals".

In S153, the abnormality monitoring unit 52 determines whether the two signals corresponding to the abnormality determination state are normal, or not. If it is determined that the two signals are normal (yes in S153), the process proceeds to S154. If it is determined that the two signals are abnormal (no in S154), the process proceeds to S155.

In S154, the abnormality monitoring unit 52 maintains the abnormality determination state. In other words, if the signals 1A and 1B are normal, the abnormality monitoring unit 52 maintains "normal" as the abnormality determination state. If the abnormality of the signal 1A or the signal 1B is identified, the abnormality monitoring unit 52 maintains "A abnormality" or "B abnormality" as the abnormality determination state.

In S155, the abnormality monitoring unit 52 sets the abnormality determination state as "abnormality detection".

In S156 advanced when the abnormality determination state is abnormality detection (yes in S151), the abnormality monitoring unit 52 performs abnormality identification. In the present embodiment, the signals 1A and 2A are the positive signals and the signals 1B and 2B are the inverted signals. Therefore, if the absolute value of the difference between the signals 1A and 2A is larger than an abnormality determination threshold Z3 and the absolute value of the difference between the signals 1B and 2B is equal to or smaller than the abnormality determination threshold Z3, the abnormality monitoring unit 52 identifies that the signal 1A is abnormal. In addition, if the absolute value of the difference between the signals 1A and 2A is equal to or smaller than the abnormality determination threshold Z3 and the absolute value of the difference between the signals 1B and 2B is larger than the abnormality determination threshold Z3, the abnormality monitoring unit 52 identifies that the signal 1B is abnormal. Incidentally, the abnormality determination thresholds Z1, Z2, and Z3 may be the same value or may be different values.

In S157, the abnormality monitoring unit 52 determines whether the signal which is abnormal has been identified, or not. When it is determined that the signal which is abnormal has been identified (yes in S157), the process proceeds to S159. When it is determined that the signal which is abnormal has not been identified (no in S157), the process proceeds to S158.

In S158, the abnormality monitoring unit 52 stops the abnormality determination state.

In S159, the abnormality monitoring unit 52 determines whether it is identified that the signal 1A is abnormal, or not. When it is determined that the signal 1A is abnormal (yes in S159), the process proceeds to S160. When it is determined that the signal 1A has not been identified as abnormal (no in S159), that is, when it is identified that the signal 1B is abnormal, the process proceeds to S161.

In S160, the abnormality monitoring unit 52 sets the abnormality determination state as A abnormality.

In S161, the abnormality monitoring unit 52 sets the abnormality determination state as B abnormality.

Figure 5:
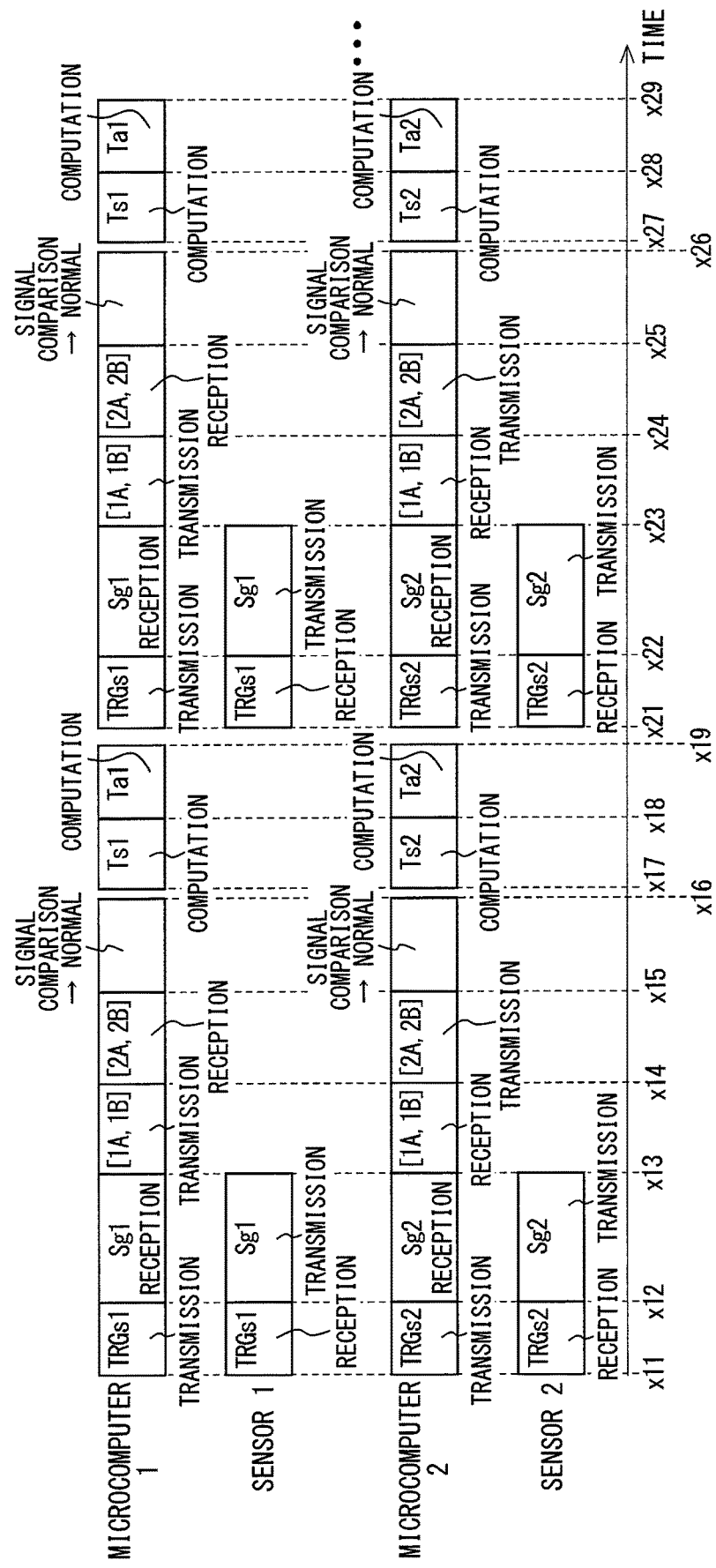
FIG. 5 is a time chart illustrating a signal transmission and reception process according to the first embodiment of the present disclosure.
Figure 6:
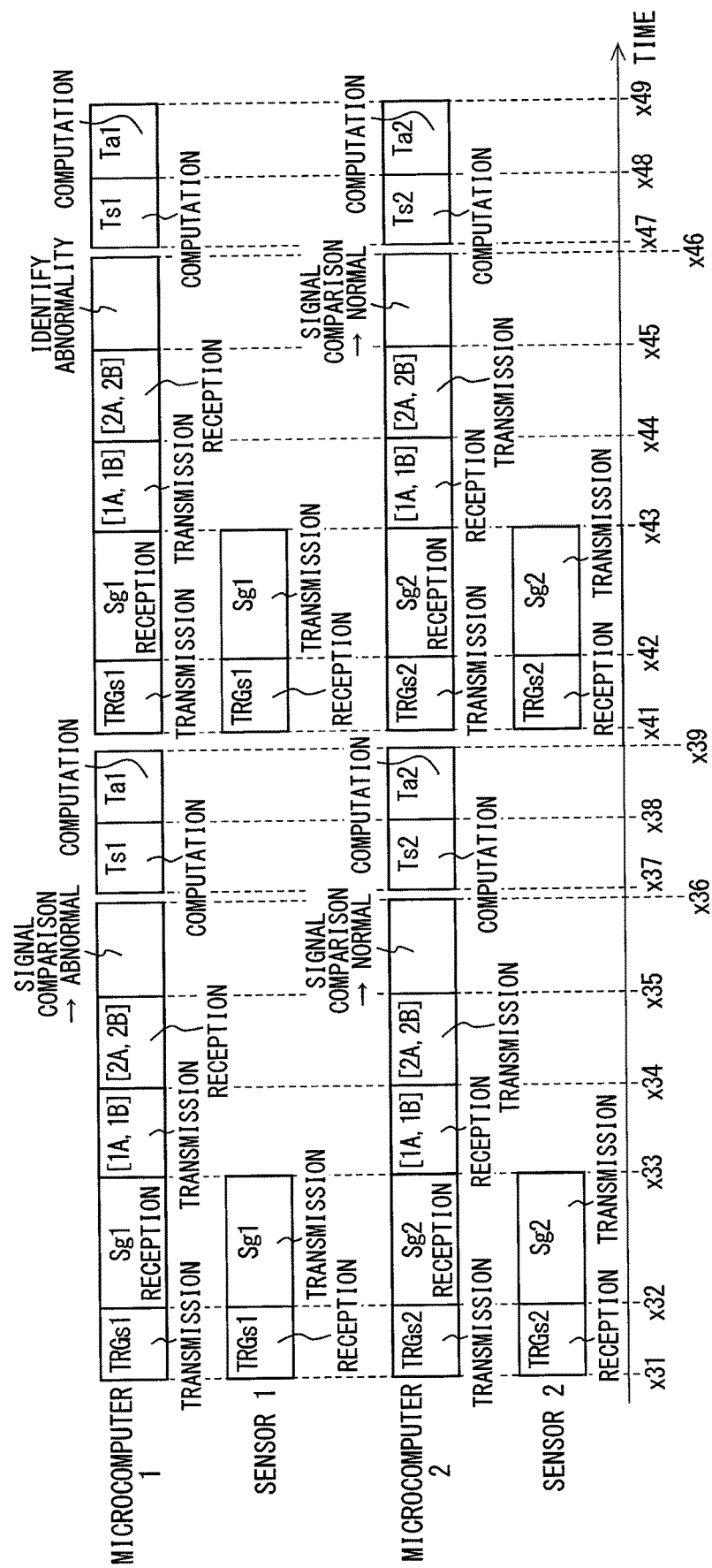
FIG. 6 is a time chart illustrating the signal transmission and reception process according to the first embodiment of the present disclosure.

The signal transmission and reception process according to the present embodiment will be described with reference to time charts of FIGS. 5 and 6. FIG. 5 shows an example in which the abnormality determination state of the first system is normal, and FIG. 6 shows an example in which the abnormality determination state of the first system is abnormality detection. In FIGS. 5 and 6, it is assumed that the abnormality determination state of the second system is normal. In FIGS. 5 and 6, the first sensor unit 10 is described as "sensor 1", the second sensor unit 20 as "sensor 2", the first microcomputer 50 as "microcomputer 1", and the second microcomputer 60 as "microcomputer 2". Further, [p, q] means an output signal including a signal p and a signal q. Specifically, [1A, 1B] is a signal including the signals 1A and 1B.

In FIG. 5 and the like, it is described that the first microcomputer 50 and the second microcomputer 60 are synchronized with each other, but the first microcomputer 50 and the second microcomputer 60 are not necessarily required to be completely synchronized with each other. It is assumed that deviation to the extent that does not affect a computation cycle is permitted.

As shown in FIG. 5, the first microcomputer 50 transmits the signal transmission trigger TRGs1 to the first sensor unit 10 at a time x11 to a time x12, and the first sensor unit 10 receives the signal transmission trigger TRGs from the first microcomputer 50. The second microcomputer 60 transmits the signal transmission trigger TRGs2 to the second sensor unit 20 and the second sensor unit 20 receives the signal transmission trigger TRGs from the second microcomputer 60.

At the time x12 to a time x13, the first sensor unit 10 transmits the output signal Sg1 to the first microcomputer 50, and the first microcomputer 50 receives the output signal Sg1 from the first sensor unit 10. The second sensor unit 20 transmits the output signal Sg2 to the second microcomputer 60 and the second microcomputer 60 receives the output signal Sg2 from the second sensor unit 20.

At the time x13 to a time x14, the first microcomputer 50 transmits a signal including the signals 1A and 1B to the second microcomputer 60, and the second microcomputer 60 receives the signal including the signals 1A and 1B from the first microcomputer 50.

At the time x14 to a time x15, the second microcomputer 60 transmits a signal including the signals 2A and 2B to the first microcomputer 50, and the first microcomputer 50 receives the signal including the signals 2A and 2B from the second microcomputer 60.

At the time x15 to a time x16, the first microcomputer 50 performs the abnormality determination by comparing the signals 1A and 1B with each other. If the signals 1A and 1B are normal, the first microcomputer 50 computes the steering torque Ts1 based on the signals 1A and 1B at a time x17 to a time x18, and the first microcomputer 50 computes the assist torque Ta1 based on the steering torque Ts1 at the time x18 to a time x19.

At the time x15 to the time x16, the second microcomputer 60 performs the abnormality determination by comparing the signals 2A and 2B with each other. If the signals 2A and 2B are normal, the second microcomputer 60 computes the steering torque Ts2 based on the signals 2A and 2B at the time x17 to the time x18, and the second microcomputer 60 computes the assist torque Tat based on the steering torque Ts2 at the time x18.

At a time x21 to a time x29, the same processing as that at the time x11 to the time x19 is performed. If the signals 1A, 1B, 2A, and 2B are normal, the same process is repeated.

In FIG. 6, the processing at a time x31 to a time x35 is the same as the processing at the time x11 to the time x15 in FIG. 5. It is assumed that the first microcomputer 50 performs the abnormality determination by comparison of the signals 1A and 1B with each other at the time x35 to a time x36, as a result of which the abnormality is detected. The first microcomputer 50 computes the steering torque Ts1 with the use of the signals 1A and 1B before the abnormality detection at a time x37 to a time x38 and computes the assist torque Ta1 at the time x38 to a time x39. At the time of detecting an abnormality, instead of the computation using the signals 1A and 1B before the abnormality detection, the first microcomputer 50 may take over a previous value of the steering torque Ts1. Likewise, the first microcomputer 50 may take over a previous value of the assist torque Ta1.

A time x41 to a time x49 are a signal cycle next to a signal cycle in which the abnormality is detected.

Processing at the time x41 to the time x45 is the same as the processing at the time x31 to the time x35. In a next signal cycle after the abnormality has been detected, at the time x45 to the time x46, the first microcomputer 50 identifies which of the sensor elements 11 and 12 is abnormal, with the use of the signals 1A, 1B, 2A, and 2B. The first microcomputer 50 computes the steering torque Ts1 with the use of the signal which is normal at the time x47 to the time x48 after the abnormality has been identified and computes the assist torque Ta1 at the time x48 to the time x49.

Processing on the second system side at the time x31 to the time x39, and the time x41 to the time x49 is the same as the processing at the times x11 to the time x19 in FIG. 5.

After the next signal cycle after the abnormality identification has been performed, the process shifts to a backup control. A time chart of the backup control is substantially the same as that in FIG. 5.

When it is determined that the sensor element 11 is abnormal, the first microcomputer 50 uses the signal 2A instead of the signal 1A. More specifically, the first microcomputer 50 performs the abnormality determination by comparing the signals 1B and 2A with each other, and if the signals 1B and 2A are normal, the first microcomputer 50 computes the steering torque Ts1 and the assist torque Ta1 with the use of the signals 1B and 2A. If the signals 1B and 2A are normal, the same processing is repeated.

When it is determined that the sensor element 12 is abnormal, the first microcomputer 50 uses the signal 2B instead of the signal 1B. More specifically, the first microcomputer 50 performs the abnormality determination by comparing the signals 1A and 2B with each other, and if the signals 1A and 2B are normal, the first microcomputer 50 computes the steering torque Ts1 and the assist torque Ta1 with the use of the signals 1A and 2B. If the signals 1A and 2B are normal, the same processing is repeated.

In the second system, when it is determined that the sensor element 21 is abnormal, the second microcomputer 60 uses the signal 1A instead of the signal 2A. More specifically, the first microcomputer 50 performs the abnormality determination by comparing the signals 1A and 2B with each other, and if the signals 1A and 2B are normal, the first microcomputer 50 computes the steering torque Ts2 and the assist torque Ta2 with the use of the signals 1A and 2B. If the signals 1A and 2B are normal, the same processing is repeated.

When it is determined that the sensor element 22 is abnormal, the second microcomputer 60 uses the signal 1B instead of the signal 2B. More specifically, the first microcomputer 50 performs the abnormality determination by comparing the signals 1B and 2A with each other, and if the signals 1B and 2A are normal, the first microcomputer 50 computes the steering torque Ts2 and the assist torque Ta2 with the use of the signals 1B and 2A. If the signals 1B and 2A are normal, the same processing is repeated.

The sensor device 1 according to the present embodiment includes the first sensor unit 10 and the first microcomputer 50, and the second sensor unit 20 and the second microcomputer 60, and has a redundant configuration. In addition, since signals can be transmitted and received between the microcomputers 50 and 60, when an abnormality occurs in the signal of the subject system, the signal of the other system is used to identify which element is abnormal. After the abnormality has been identified, the signal of the element in which the abnormality has occurred is replaced with the signal of the other system. This makes it possible to continue the torque computation in the two systems while continuing the abnormality monitoring even when the abnormality occurs in some sensor elements.

In the present embodiment, the example in which when the signal 1A is abnormal, the signal 1A is replaced with the signal 2A has been mainly described. However, the abnormal signal may be replaced with any signal of the other system such that the signal 1A is replaced with the signal 2B. In addition, even the signals 1A and 1B are abnormal, if the signals 2A and 2B are normal, the torque computation can be continued in the second system. Likewise, even if the signals 2A and 2B are abnormal, if the signals 1A and 1B are normal, the torque computation can be continued in the first system. In other words, in the present embodiment, if two of the four signals are normal, the torque computation can be continued.

As described above, the sensor device 1 according to the present embodiment includes the multiple sensor units 10, 20 and the multiple microcomputers 50, 60.

The first sensor unit 10 has the multiple sensor elements 11, 12 and the sensor IC 13. The sensor IC 13 generates and transmits the output signal Sg1 including the signals 1A and 1B which are detection signals corresponding to the detection values of the sensor elements 11 and 12. The second sensor unit 20 has the multiple sensor elements 21, 22 and the sensor IC 23. The sensor IC 23 generates and transmits the output signal Sg2 including the signals 2A and 2B which are detection signals corresponding to the detection values of the sensor elements 21 and 22.

The first microcomputer 50 includes the sensor communication unit 51, the abnormality monitoring unit 52, and the torque computation unit 53. The sensor communication unit 51 receives the output signal Sg1 transmitted from the first sensor unit 10 provided correspondingly. The abnormality monitoring unit 52 monitors the abnormality of the first sensor unit 10. The torque computation unit 53 computes the steering torque Ts1 which is a physical quantity based on at least one normal detection signal.

The second microcomputer 60 includes the sensor communication unit 61, the abnormality monitoring unit 62, and the torque computation unit 63. The sensor communication unit 61 receives the output signal Sg2 transmitted from the second sensor unit 20 provided correspondingly. The abnormality monitoring unit 62 monitors the abnormality of the second sensor unit 20. The torque computation unit 63 computes the steering torque Ts2 which is a physical quantity based on at least one normal detection signal.

In this example, "provided correspondingly" means that the first sensor unit 10 and the first microcomputer 50 can communicate with each other, and that the second sensor unit 20 and the second microcomputer 60 can communicate with each other.

The first microcomputer 50 can mutually transmit and receive the signals 1A and 1B included in the output signal Sg1 received by the first microcomputer 50 from the first sensor unit 10 and the signals 2A and 2B included in the output signal Sg2 received by the second microcomputer 60 from the second sensor unit 20, with respect to the second microcomputer 60.

The second microcomputer 60 can mutually transmit and receive the signals 2A and 2B included in the output signal Sg2 received by the second microcomputer 60 from the second sensor unit 20 and the signals 1A and 1B included in the output signal Sg1 received by the first microcomputer 50 from the first sensor unit 10, with respect to the first microcomputer 50.

In the present embodiment, since the first microcomputer 50 and the second microcomputer 60 can communicate with each other, the first microcomputer 50 can acquire the signals 2A and 2B of the second sensor unit 20 in addition to the signals 1A and 1B of the first sensor unit 10 provided correspondingly. Likewise, the second microcomputer 60 can acquire the signals 1A and 1B of the first sensor unit 10 in addition to the signals 2A and 2B of the second sensor unit provided correspondingly. In other words, the microcomputers 50 and 60 can appropriately use the four signals 1A, 1B, 2A, and 2B for abnormality monitoring and torque computation.

As a result, even when the abnormality occurs in some sensor elements 11, 12, 21, and 22, if two or more sensor elements are normal, abnormality monitoring by signal comparison and torque computation can be continued. In addition, for example, when one sensor element is abnormal and another configuration such as the microcomputer is normal, there is no need to stop the function of the entire system including the abnormal portion, and processing can be continued in a normal portion.

The abnormality monitoring unit 52 detects the abnormality of the sensor elements 11 and 12 based on the signals 1A and 1B which are multiple subject sensor signals. The abnormality monitoring unit 62 detects the abnormality of the sensor elements 21 and 22 based on the signals 2A and 2B which are multiple subject sensor signals.

This makes it possible to appropriately detect the abnormality of the sensor element of the subject system.

When the abnormality of the sensor elements 11 and 12 is detected based on the signals 1A and 1B, the abnormality monitoring unit 52 identifies the sensor elements 11 and 12 which are abnormal with the use of the signals 1A and 1B and at least one signal 2A or 2B which is another sensor signal. When the abnormality of the sensor elements 21 and 22 is detected based on the signals 2A and 2B, the abnormality monitoring unit 62 identifies the sensor elements 21 and 22 which are abnormal with the use of the signals 2A and 2B and at least one signal 1A or 1B which is another sensor signal.

When two sensor elements are provided in one sensor unit 10 or 20, there are two subject sensor signals. In comparison of two signals, it can be detected that one of the signals is abnormal, but it cannot be identified which signal is abnormal. Therefore, in the present embodiment, the other sensor signal is used in addition to the subject sensor signal, thereby being capable of appropriately identifying a signal in which the abnormality occurs by comparison with three or more signals. Moreover, if the signal in which the abnormality occurs can be identified, the use of the normal signal can be continued.

When the abnormal sensor elements 11 and 12 are identified, the abnormality monitoring units 52 and 62 continue the abnormality monitoring according to at least two signals that are normal among the signals 1A, 1B, 2A, and 2B. As a result, if at least two of the subject sensor signals and other sensor signals are normal, the abnormality monitoring by signal comparison can be continued. In addition, the torque computation units 53 and 63 can properly continue the torque computation with the use of the normal signals.

The first microcomputer 50 receives the signals 2A and 2B from the second microcomputer 60 in a predetermined cycle. The second microcomputer 60 receives the signals 1A and 1B from the first microcomputer 50 in the predetermined cycle.

A periodic communication between the microcomputers 50 and 60 is performed in a predetermined cycle, thereby being capable of simplifying the control configuration in the microcomputers 50 and 60.

The sensor elements 11, 12, 21, and 22 are magnetic detection elements that detect a magnetic flux to be detected. The sensor elements 11, 12, 21, and 22 detect the conversion of the magnetic flux which changes according to the torque. The torque computation units 53 and 63 compute the torque as a physical quantity.

In other words, the sensor device 1 according to the present embodiment is a torque sensor, and can appropriately detect the torque (steering torques Ts1 and Ts2 in the present embodiment).

The electric power steering device 8 includes the sensor device 1, the motor 81 that outputs the assist torque Ta for assisting the steering of the steering wheel 91 by a driver, and the reduction gear 82 that transmits the torque of the motor 81 to the steering shaft 92.

The torque computation units 53 and 63 compute the steering torques Ts1 and Ts2 as the physical quantities.

The first microcomputer 50 includes a command computation unit 45 that computes a command value related to a driving control of the motor 81 based on the steering torque Ts1. The second microcomputer 60 includes the command computation unit 45 that computes the command value related to the driving control of the motor 81 based on the steering torque Ts2.

In the sensor device 1, since the abnormality of the sensor elements 11, 12, 21, and 22 is appropriately monitored, the steering torque Ts is appropriately computed. As a result, the assist torque Ta is appropriately computed based on the steering torque Ts, thereby being capable of appropriately controlling the driving of the motor 81.

In the present embodiment, the signals 1A, 1B, 2A, and 2B correspond to the "detection signals".

In the first microcomputer 50, the second microcomputer 60 corresponds to the "other system control unit", the signals 1A and 1B correspond to the "subject sensor signal", and the signals 2A and 2B correspond to the "other sensor signals".

In the second microcomputer 60, the first microcomputer 50 corresponds to the "other system control unit", the signals 2A and 2B correspond to the "subject sensor signal", and the signals 1A and 1B correspond to the "other sensor signals".

Further, the sensor communication units 51 and 61 correspond to the "communication unit".

Second Embodiment

A second embodiment according to the present disclosure is illustrated in FIGS. 7 to 10.

In the embodiment described above, when the abnormal determination state is other than stop, the signals of the other systems are acquired irrespective of the abnormality determination state, whereas in the present embodiment, the signals of the other systems are acquired according to the abnormality determination state, which is different from the above embodiment. Since the configurations and the like of the sensor unit 5 and the ECU 40 are the same as those in the embodiment described above, a description of those configurations will be omitted. The processing in the sensor units 10 and 20 is the same as that in the embodiment described above.

Similarly, in the present embodiment, since the processing in the first system is substantially the same as the processing in the second system, the processing in the first system will be mainly described below.

The torque computation process according to the present embodiment will be described with reference to a flowchart of FIG. 7. In this example, as in the description of FIG. 3, a description will be given as processing in the microcomputer 50.

Figure 3:
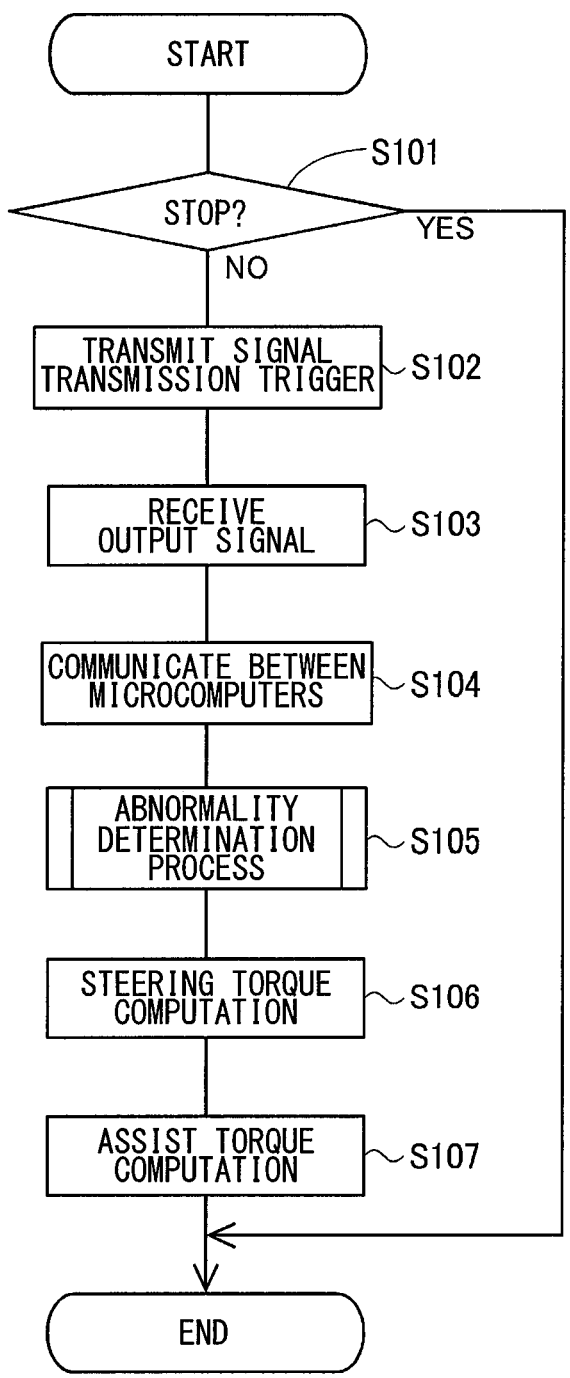
FIG. 3 is a flowchart illustrating a torque computation process according to the first embodiment of the present disclosure.

The processing in S201 to S203 is the same as the processing of S101 to S103 in FIG. 3.

In S204, the inter-microcomputer communication unit 57 determines whether the abnormality determination state is normal, or not. When it is determined that the abnormality determination state is normal (yes in S204), the process proceeds to S213. When it is determined that the abnormality determination state is not normal (no in S204), the process proceeds to S205.

In S205, the inter-microcomputer communication unit 57 determines whether the abnormality determination state is A abnormality, or not. The "A abnormality" means a state in which the abnormality of the signal 1A is identified. When it is determined that the abnormality determination state is A abnormality (yes in S205), the process proceeds to S207. When it is determined that the abnormality determination state is not A abnormality (no in S205), the process proceeds to S206.

In S206, the inter-microcomputer communication unit 57 determines whether the abnormality determination state is B abnormality, or not. The "B abnormality" means a state in which the abnormality of the signal 1B is identified. When it is determined that the abnormality determination state is B abnormality (yes in S206), the process proceeds to S209. When it is determined that the abnormality determination state is not B abnormality (no in S206), the abnormality determination state is abnormality detection, and the process proceeds to S211.

In S207 advanced when it is determined that the abnormality determination state is A abnormality (yes in S205), the inter-microcomputer communication unit 57 transmits an A abnormality trigger TRGa to the second microcomputer 60. Upon receiving the A abnormality trigger TRGa, the second microcomputer 60 transmits a signal including the signal 2A to the first microcomputer 50.

In S208, the inter-microcomputer communication unit 57 receives the signal including the signal 2A which is the signal A of the other system from the second microcomputer 60.

In S209 advanced when it is determined that the abnormality determination state is B abnormality (yes in S206), the inter-microcomputer communication unit 57 transmits a B abnormality trigger TRGb to the second microcomputer 60. Upon receiving the B abnormality trigger TRGb, the second microcomputer 60 transmits a signal including the signal 2B to the first microcomputer 50.

In S210, the inter-microcomputer communication unit 57 receives the signal including the signal 2B which is the signal B of the other system from the second microcomputer 60.

In S211 advanced when the abnormality determination state is abnormality detection (no in S206), the inter-microcomputer communication unit 57 transmits an abnormality detection trigger TRGe to the second microcomputer 60. Upon receiving the abnormality detection trigger TRGe, the second microcomputer 60 transmits a signal including the signals 2A and 2B to the first microcomputer 50.

In S212, the inter-microcomputer communication unit 57 receives the signal including the signals 2A and 2B which are the signals A and B of the other system from the second microcomputer 60. Incidentally, the signals received in S208, S210 and S212 may be the same signals including the signals 2A and 2B.

In the present embodiment, an event communication is performed in which the signals of other systems are received when the abnormality determination state is "abnormality detection", "A abnormality" or "B abnormality". If the abnormality determination state is "normal", trigger transmission to the second microcomputer 60 and reception of the other system signals are not performed.

In S213 advanced when an affirmative determination is performed in S 204 or subsequent to S208, S210 or S212, the inter-microcomputer communication unit 57 determines whether an abnormal state trigger has been received from the second microcomputer 60, or not. The abnormal state trigger is the abnormality detection trigger TRGe, the A abnormality trigger TRGa, or the B abnormality trigger TRGb. When it is determined that the abnormal state trigger has not been received (no in S213), the process proceeds to S215. When it is determined that the abnormal state trigger has been received (yes in S213), the process proceeds to S214.

In S214, the inter-microcomputer communication unit 57 transmits at least one of the signal 1A and the signal 1B to the second microcomputer 60 according to the received abnormal state trigger. It should be noted that when the abnormality of the signal to be transmitted to the second microcomputer 60 is confirmed, the signal transmission may not be performed.

In S215, as in S105 of FIG. 3, the abnormality determination process in FIG. 4 is performed. The processing of S216 and S217 is similar to the processing of S106 and S107 in FIG. 3.

Figure 7:
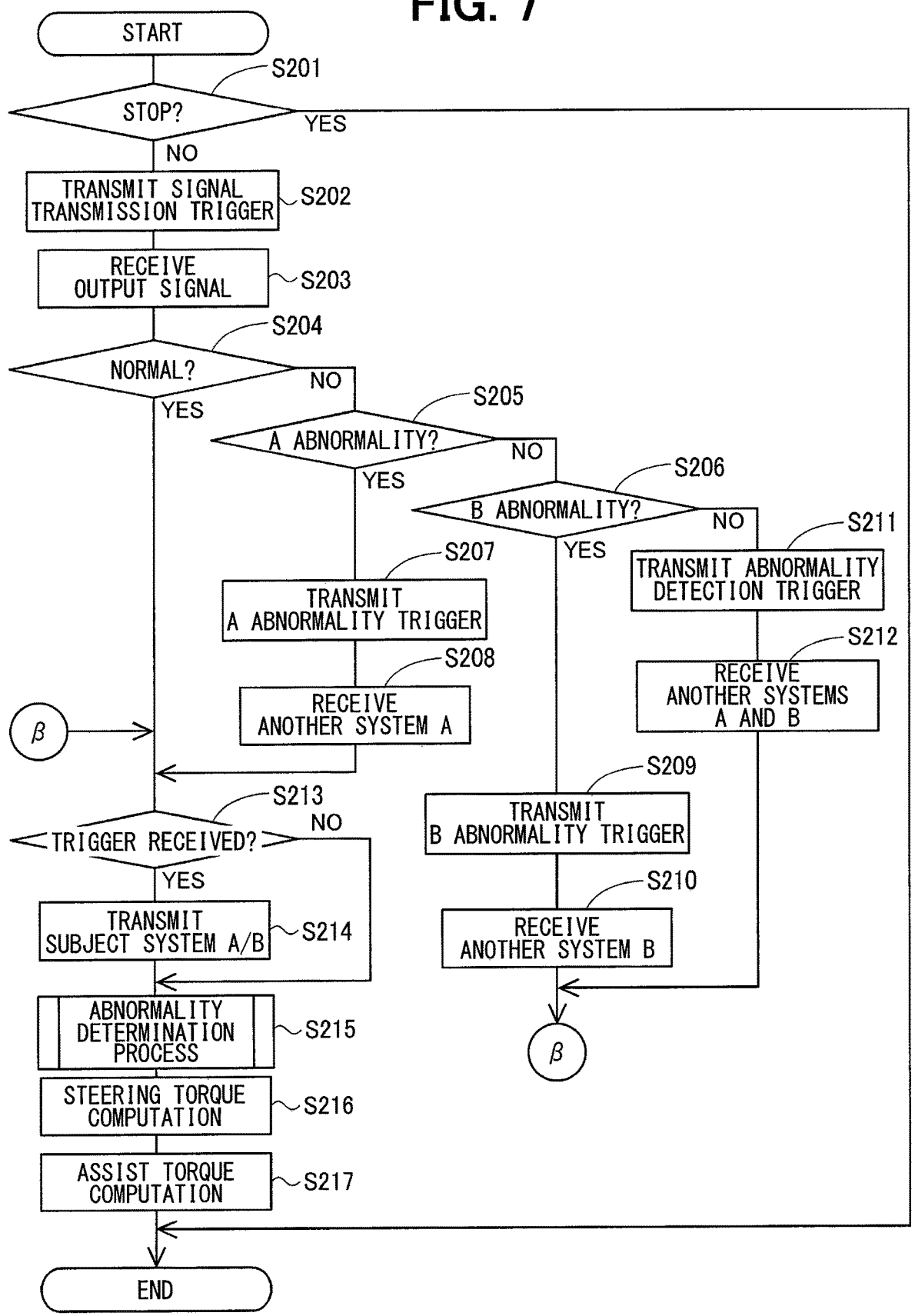
FIG. 7 is a flowchart illustrating a torque computation process according to a second embodiment of the present disclosure.

In FIG. 7, S204 to S206 are processing for sorting the abnormality determination state, and the processing order can be interchanged. In addition, S204 to S212 are processing related to the reception of the signals of other systems corresponding to the abnormality determination state of the subject system, and S213 and S214 are processing related to the transmission of the signal of the subject system corresponding to the abnormality determination state of the other system. The processing of S204 to S212 and the processing of S213 and S214 may be interchanged with each other. For example, the first microcomputer 50 first performs the processing in S204 to S212, and the second microcomputer 60 first performs the processing in S213 and S214. Thus, and the processing order may be different for each of the microcomputers 50 and 60.

Figure 8:
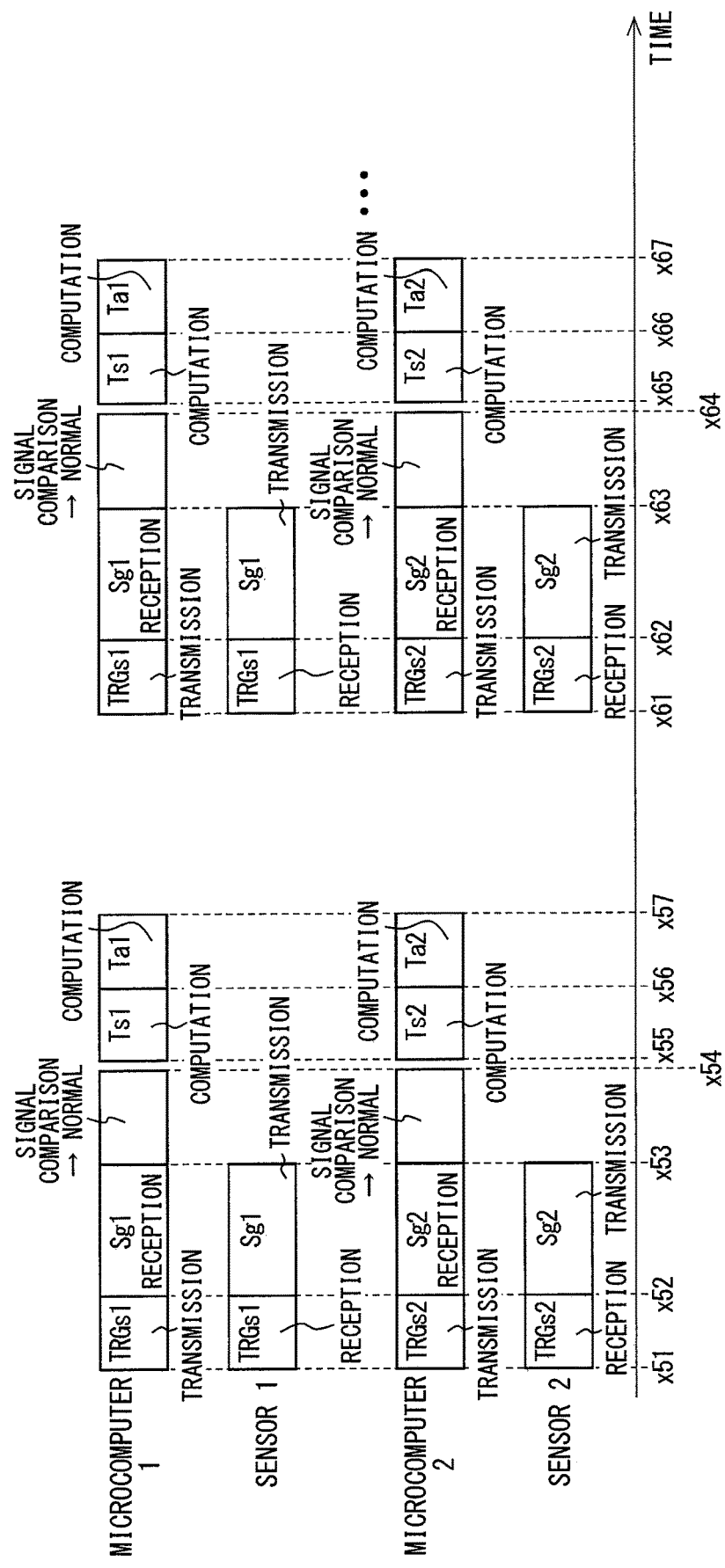
FIG. 8 is a time chart illustrating a signal transmission and reception process according to the second embodiment of the present disclosure.
Figure 9:
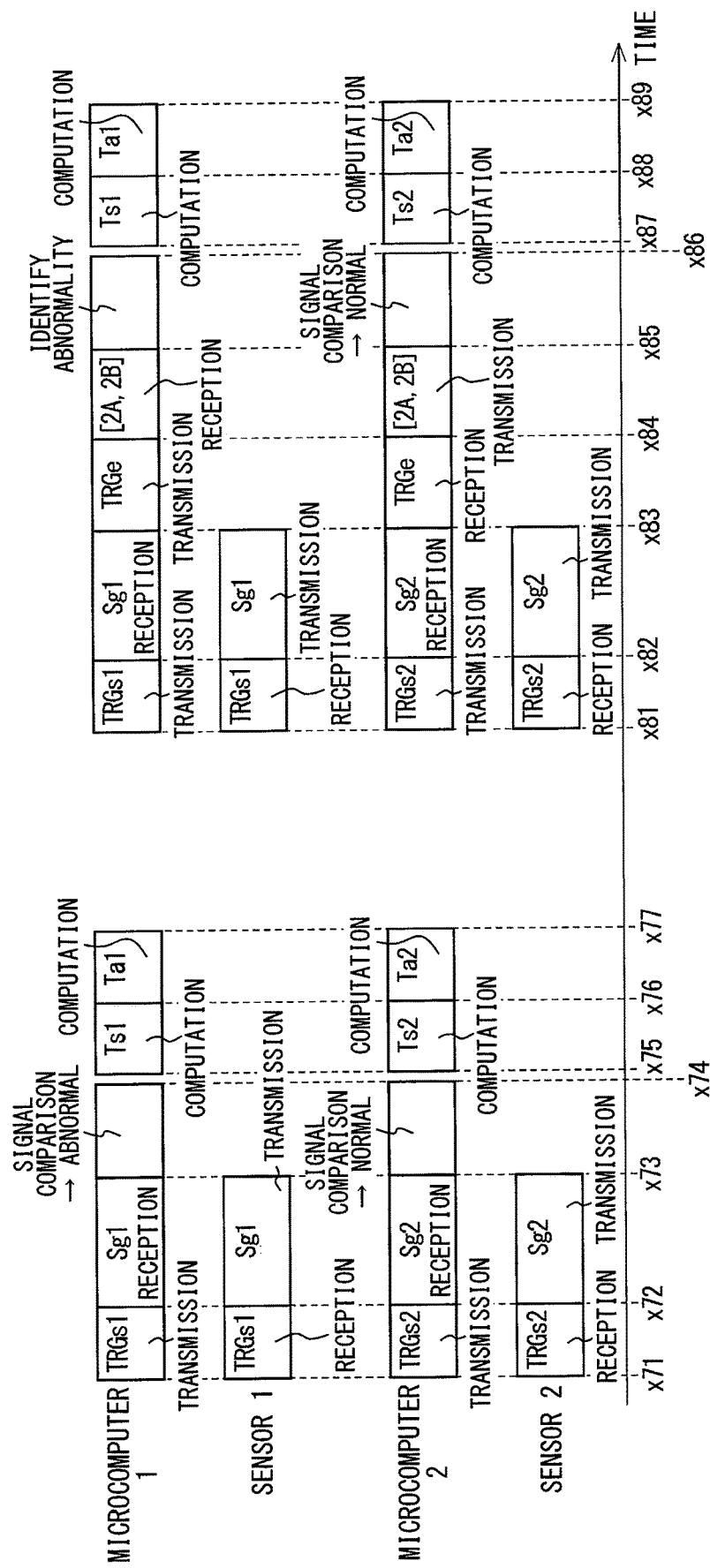
FIG. 9 is a time chart illustrating the signal transmission and reception process according to the second embodiment of the present disclosure.
Figure 10:
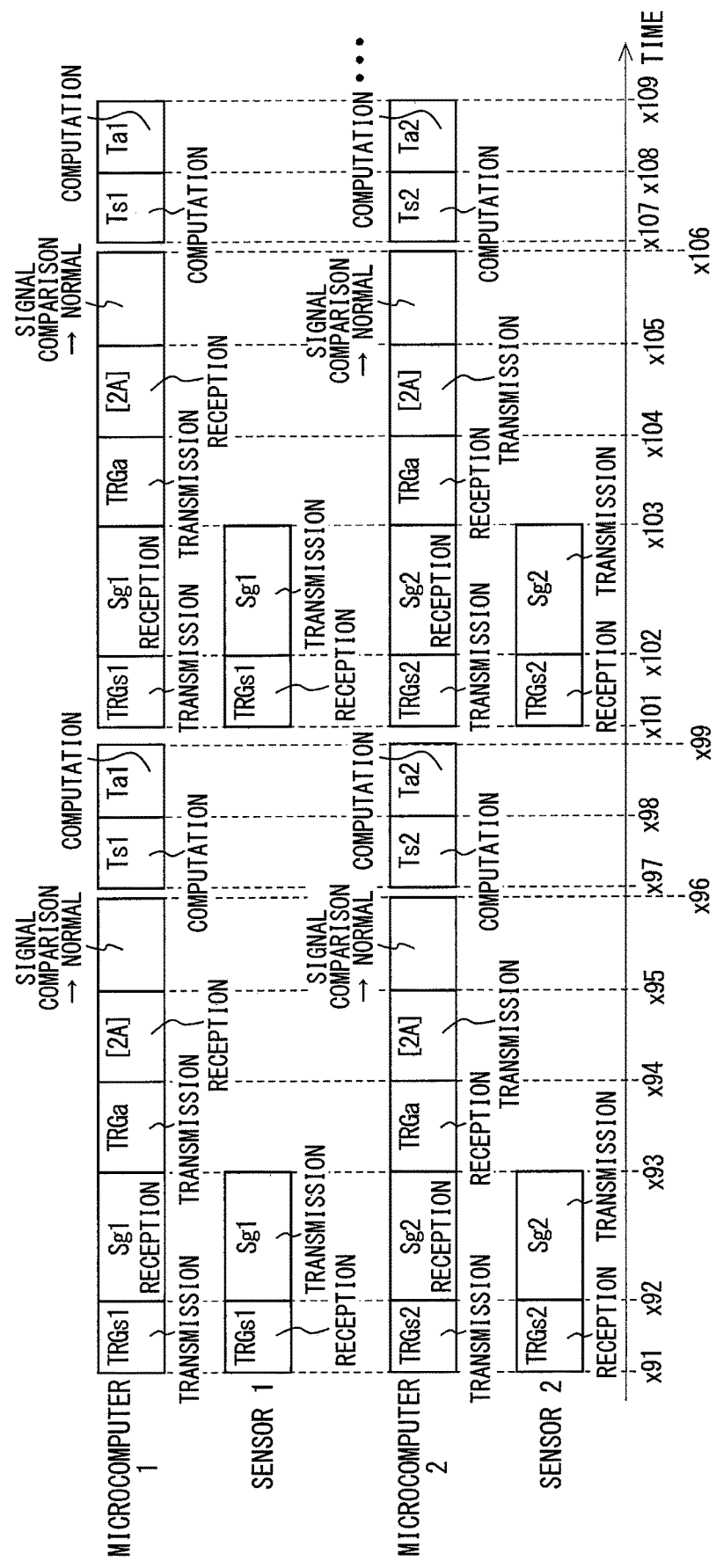
FIG. 10 is a time chart illustrating the signal transmission and reception process according to the second embodiment of the present disclosure.

The signal transmission and reception process according to the present embodiment will be described with reference to time charts of FIGS. 8 to 10. FIG. 8 shows an example in which the abnormality determination state of the first system is normal, FIG. 9 shows an example in which the abnormality determination state of the first system is abnormality detection, and FIG. 10 shows an example in which the abnormality determination state of the first system is A abnormality. In FIGS. 8 to 10, it is assumed that the abnormality determination state of the second system is normal.

The processing at a time x51 to a time x53 in FIG. 8 is the same as the processing at the time x11 to the time x13 in FIG. 5, and the processing at the time x53 to a time x57 is the same as the processing at the time x15 to the time x19 in FIG. 5. In other words, in the present embodiment, when the abnormality determination state is normal, the signal transmission and reception processing performed at the time x13 to the time x15 in FIG. 5 is omitted. This makes it possible to reduce a communication load during normal operation.

Processing at a time x61 to a time x67 is similar to the processing at the time x51 to the time x57, and when the abnormality determination state is normal, the same processing is repeated.

In FIG. 9, the processing at a time x71 to a time x73 is the same as the processing at the time x31 to the time 33 in FIG. 6, and the processing at the time x73 to a time x77 is the same as the processing at the time x35 to the time x39 in FIG. 6. In other words, it is assumed that the first microcomputer 50 performs the abnormality determination by comparison of the signals 1A and 1B with each other at the time x73 to the time x74, as a result of which the abnormality is detected.

A time x81 to a time x89 are a signal cycle next to a signal cycle in which the abnormality is detected.

Processing at the time x81 to the time x83 is the same as the processing at the time x71 to the time x73.

At the time x83 to the time x84, the first microcomputer 50 transmits the abnormality detection trigger TRGe to the second microcomputer 60, and the second microcomputer 60 receives the abnormality detection trigger TRGe from the first microcomputer 50.

At the time x83 to the time x84, the second microcomputer 60 transmits a signal including the signals 2A and 2B to the first microcomputer 50, and the first microcomputer 50 receives the signal including the signals 2A and 2B from the second microcomputer 60.

Processing at the time x85 to the time x89 is the same as the processing at the time x45 to the time x49 in FIG. 6. In other words, the first microcomputer 50 identify which of the sensor elements 11 and 12 is abnormal with the use of the signals 1A, 1B, 2A, and 2B, and performs the torque computation with the use of the normal signal.

In this example, since the second system is normal, the abnormality determination by comparing the signals 2A and 2B with each other and the torque computation using the signals 2A and 2B are continued in the second microcomputer 60. The same is applied to FIG. 10.

After the next signal cycle after the abnormality identification has been performed, the process shifts to a backup control.

The processing at a time x91 to a time 93 in FIG. 10 is the same as the processing at the time x51 to the time x53 in the normal state.

When it is determined that the sensor element 11 is abnormal in the signal cycle of the time x81 to the time x89 (refer to FIG. 9), at the time x93 to a time x94, the first microcomputer 50 transmits the A abnormality trigger TRGa to the second microcomputer 60, and the second microcomputer 60 receives the A abnormality trigger TRGa from the first microcomputer 50. At the time x94 to a time x95, the second microcomputer 60 transmits a signal including the signal 2A to the first microcomputer 50, and the first microcomputer 50 receives the signal including the signal 2A from the second microcomputer 60.

At the time x95 to a time x96, the abnormality determination is performed by comparing the signal 1B and the signal 2A with each other. If the signals 1B and 2A are normal, the steering torque Ts1 is computed with the use of the signals 1B and 2A at a time x97 to a time x98, and the assist torque Ta is computed at the time x98 to a time x99.

Processing at a time x101 to a time x109 is the same as the processing at the time x91 to the time x99, and if the signals 1B and 2A are normal, the same processing is repeated.

When it is determined that the sensor element 12 is abnormal in the signal cycle of the time x81 to the time x89, the first microcomputer 50 transmits the B abnormality trigger TRGb to the second microcomputer 60 instead of the A abnormality trigger TRGa. Upon receiving the B abnormality trigger TRGb, the second microcomputer 60 transmits a signal including the signal 2B to the first microcomputer 50. The first microcomputer 50 performs the abnormality determination by comparing the signals 1A and 2B with each other, and if the signals 1A and 2B are normal, the first microcomputer 50 performs the torque computation with the use of the signals 1A and 2B.

In this case, an example in which an abnormality occurs on the first system side has been described. Similarly, in the case where an abnormality occurs on the second system side, the second microcomputer 60 transmits a trigger corresponding to the abnormal state to the first microcomputer 50 and receives a signal corresponding to the trigger from the first microcomputer 50. Details of the abnormality determination or the like are the same as those when the abnormality occurs in the first system.

In the present embodiment, the microcomputers 50 and 60 transmit an abnormal state trigger according to the abnormal state when the abnormality determination state is "abnormality detection", "A abnormality" or "B abnormality", and receive the signal of another system. In other words, if the sensor element is normal and the abnormality determination state is "normal", each of the microcomputers 50 and 60 does not receive the signal from the microcomputer of the other system. In other words, in the present embodiment, each microcomputer acquires the signals of the other systems over an event communication corresponding to the abnormality determination state. This makes it possible to reduce the communication load between the microcomputers 50 and 60 in the normal state.

When there is a need to acquire the signals 2A and 2B, the first microcomputer 50 transmits the trigger signal to the second microcomputer 60 and receives the signals 2A and 2B transmitted from the second microcomputer 60 according to the trigger signal. When there is a need to acquire the signals 1A and 1B, the second microcomputer 60 transmits the trigger signal to the first microcomputer 50 and receives the signals 1A and 1B transmitted from the first microcomputer 50 according to the trigger signal. In this example, "when there is a need to acquire another sensor signal" is a case in which the abnormality determination state is "abnormality detection", "A abnormality", and "B abnormality". Further, the abnormal state trigger, which is the abnormality detection trigger TRGe, the A abnormality trigger TRGa, or the B abnormality trigger TRGb, corresponds to "trigger signal".

The communication between the microcomputers 50 and 60 is set to the event communication according to the trigger signal, thereby being capable of reducing the communication load.

The same effects as those in the embodiments described above can be obtained.

Other Embodiments (a) Output Signal

In the embodiments described above, one detection signal of the two sensor elements provided in one sensor unit is set to the positive signal, and the other detection signal is the inverted signal. In another embodiment, the detection signals of the multiple sensor elements may be the same value if those detection signals are normal. In other words, the multiple detection signals may be the positive signals or the inverted signals.

(b) Processing at the Time of Abnormality Detection

In the embodiments described above, when the abnormality of the sensor element is detected in one system, signals corresponding to all of the sensor elements of the other system are acquired to perform the abnormality identification. In another embodiment, when the abnormality of the sensor element is detected, at least one signal may be acquired from another system to perform the abnormality identification. Specifically, for example, when the abnormality is detected in the first system, one of the signal 2A and the signal 2B may be acquired from the second system side. For example, when the signal 2A is acquired, the first microcomputer 50 compares the signal 1A with the signal 2A and compares the signal 1B with the signal 2A, thereby being capable of identifying the signal which is abnormal. If the signals to be compared are the inverted values, the abnormality determination is performed based on an added value, and if the signals to be compared are the same value, the abnormality determination is performed based on the difference value.

(c) Processing after Abnormality Identification

In the embodiments described above, when the signal 1A is abnormal in the first system, the signal 2A is acquired from the second system. In another embodiment, a signal acquired from another system when the element having the abnormality is identified may be any signal of another system. Specifically, for example, when the signal 1A is abnormal, the signal 2A may be replaced with the signal 2B.

In the second embodiment, the control unit transmits the abnormality detection trigger and receives the other system signal in the next signal cycle after the abnormality has been detected. In another embodiment, the abnormality detection trigger may be transmitted in the next signal cycle after the abnormality has been detected and the other system signal may be received in the next and subsequent signal cycles after the abnormality detection trigger has been transmitted. As a result, a communication delay can be prevented.

(d) Sensor Device

The sensor device according to the embodiments described above is provided with two sets of sensor units and control units. In another embodiment, three or more sets of sensor units and control units may be provided. Further, in the embodiments described above, one sensor unit is provided for one control unit. In another embodiment, multiple sensor units may be provided for one control unit.

In the embodiments described above, a communication between the sensor unit and the control unit is a so-called "synchronous communication" in which an output signal is transmitted from the sensor unit in response to a signal transmission trigger from the control unit. In another embodiment, the communication between the sensor unit and the control unit may be a so-called "asynchronous communication" in which the output signal is transmitted from the sensor unit without depending on the signal transmission trigger from the control unit.

In the embodiments described above, each of the sensor units has the two sensor elements. In another embodiment, three or more sensor elements may be provided in each sensor unit. When there are three or more sensor elements, three or more detection signals are included in the output signal. In that case, if there are three or more subject sensor signals that are available for abnormality monitoring, abnormality identification is performed by comparing the subject sensor signals with each other, and when an abnormality is detected when there are two subject sensor signals that are available for abnormality monitoring, the abnormality identification may be performed with the use of another sensor signal. Even when three or more subject sensor signals are available for abnormality monitoring, the abnormality identification may be performed with the use of another sensor signal.

In the embodiments described above, the sensor element is a magnetic detection element. In another embodiment, the sensor element may be an element for detecting a physical quantity other than magnetic flux. Further, the sensor element according to the embodiments described above detects the steering torque. In another embodiment, the sensor element may detect any physical quantity such as a torque other than the steering torque, a rotation angle, a stroke, a load, or a pressure.

In the embodiments described above, the sensor device is applied to the torque sensor of the electric power steering device. In another embodiment, the sensor device may be applied to an in-vehicle device other than the electric power steering device, or may be applied to a device not mounted in the vehicle.

It is noted that a flowchart or the processing of the flowchart in the present application includes sections (also referred to as steps), each of which is represented, for instance, as S11. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A sensor device comprising:
a plurality of sensor units, each of which includes a plurality of sensor elements and a signal processing unit that generates and transmits an output signal including a plurality of detection signals corresponding to detection values of the sensor elements; and
a plurality of control units, each of which includes a communication unit that receives the output signal transmitted from a respective sensor unit, an abnormality monitoring unit that monitors abnormality of the respective sensor unit, and a physical quantity computation unit that computes a physical quantity based on at least one of the detection signals which is normal, wherein:
one of the control units mutually transmits the detection signals as a plurality of subject sensor signals, included in the output signal received from the respective sensor unit, to another one of the control units, and receives the detection signals as a plurality of other sensor signals, included in the output signal received from another one of the sensor units by another one of the control units as another system control unit, from the another system control unit;
the plurality of subject sensor signals and the plurality of other sensor signals are replaceable;
the abnormality monitoring unit detects abnormality of the sensor elements based on the plurality of subject sensor signals;
the abnormality monitoring unit identifies one of the sensor elements that is abnormal using the plurality of subject sensor signals and at least one of the plurality of other sensor signals in response to the abnormality monitoring unit detecting the abnormality of the sensor elements based on the plurality of subject sensor signals; and
each of the plurality of subject sensor signals includes a positive signal and an inverted signal, and each of the plurality of other sensor signals includes a positive signal and an inverted signal.

2. The sensor device according to claim 1, wherein:
in response to an abnormal sensor element being identified, the abnormality monitoring unit continues monitoring the abnormality of the respective sensor unit based on at least two signals, which are normal, among the plurality of subject sensor signals and the plurality of other sensor signals.

3. The sensor device according to claim 1, wherein:
each control unit receives the plurality of other sensor signals from the other system control unit in a predetermined cycle.

4. The sensor device according to claim 1, wherein:
in response to the plurality of other sensor signals being required to receive, each control unit transmits a trigger signal to the other system control unit, and receives the plurality of other sensor signals transmitted from the other system control unit according to the trigger signal.

5. The sensor device according to claim 1, wherein:
each sensor element is a magnetic detection element that detects a magnetic flux as a detection object.

6. The sensor device according to claim 5, wherein:
each sensor element detects a change in the magnetic flux that changes in accordance with a torque; and
the physical quantity computation unit computes a torque as the physical quantity.

7. An electric power steering device comprising:
the sensor device according to claim 6;
a motor that outputs an assist torque for assisting a steering operation of a steering member by a driver; and
a power transmission unit that transmits a torque of the motor to a driven object, wherein:
the physical quantity computation unit computes a steering torque as the physical quantity; and
the control unit includes a command computation unit that computes a command value related to a drive control of the motor based on the steering torque.

8. The sensor device according to claim 1, wherein:
the abnormality monitoring unit identifies the one of the sensor elements that is abnormal by comparing a positive signal and an inverted signal of each of a subject sensor signal and an other sensor signal in the one of the sensor elements with predetermined abnormality determination thresholds.

9. The sensor device according to claim 8, wherein:
the abnormality monitoring unit identifies the one of the sensor elements that is abnormal by comparing an absolute value of a difference between the positive signal of the subject sensor signal and the positive signal of the other sensor signal with a predetermined abnormality determination threshold and comparing an absolute value of a difference between the inverted signal of the subject sensor signal and the inverted signal of the other sensor signal with a predetermined abnormality determination threshold.

10. The sensor device according to claim 1, wherein:
at least one abnormal subject sensor signal is replaceable with at least one other sensor signal in response to the at least one abnormal subject sensor signal being identified, and
at least one abnormal other sensor signal is replaceable with at least one subject sensor signal in response to the at least one abnormal other sensor signal being identified.

* * * * *